(12) United States Patent
Tantillo et al.

(10) Patent No.: US 10,964,451 B2
(45) Date of Patent: Mar. 30, 2021

(54) CABLE HOSE WITH CONDUCTIVE ELECTROMAGNETIC INTERFERENCE SHIELD

(71) Applicant: The ESAB Group Inc., Florence, SC (US)

(72) Inventors: James Tantillo, Enfield, NH (US); Michael Nadler, Wilmot, NH (US); Andrew Raymond, Lebanon, NH (US)

(73) Assignee: The ESAB Group Inc., Florence, SC (US)

( * ) Notice: Subject to any disclaimer, the term of this patent is extended or adjusted under 35 U.S.C. 154(b) by 215 days.

(21) Appl. No.: 16/181,832

(22) Filed: Nov. 6, 2018

(65) Prior Publication Data

US 2020/0143958 A1 May 7, 2020

(51) Int. Cl.
| | | |
|---|---|---|
| *B23K 10/00* | (2006.01) | |
| *H01B 9/00* | (2006.01) | |
| *H01B 9/02* | (2006.01) | |
| *H01B 13/016* | (2006.01) | |
| *H01B 13/22* | (2006.01) | |

(52) U.S. Cl.
CPC .............. *H01B 9/001* (2013.01); *B23K 10/00* (2013.01); *H01B 9/029* (2013.01); *H01B 13/0165* (2013.01); *H01B 13/221* (2013.01)

(58) Field of Classification Search
CPC .... H01B 9/001; H01B 9/029; H01B 13/0165; B23K 10/00; B23K 10/02; B23K 10/006; H05H 1/26; H05H 1/36
USPC .............. 219/121.5, 121.54, 121.57, 121.39, 219/121.45, 121.59
See application file for complete search history.

(56) References Cited

U.S. PATENT DOCUMENTS

| | | | |
|---|---|---|---|
| 2,941,023 A | * | 6/1960 | Tribe ...................... H01R 9/11 |
| | | | 174/15.7 |
| 3,923,448 A | | 12/1975 | Guth |
| 4,234,779 A | | 11/1980 | Willems |
| 4,835,853 A | | 6/1989 | Hirschberg |
| 4,839,492 A | | 6/1989 | Bouchier et al. |
| 5,132,513 A | | 7/1992 | Ingwersen et al. |

(Continued)

FOREIGN PATENT DOCUMENTS

| | | |
|---|---|---|
| CN | 204423935 U | 6/2015 |
| EP | 0237441 A2 | 9/1987 |

(Continued)

OTHER PUBLICATIONS

Extended European Search Report for EP Application No. 19195738.0 dated Feb. 19, 2020, 9 pages.

(Continued)

*Primary Examiner* — Mark H Paschall
(74) *Attorney, Agent, or Firm* — Edell, Shapiro & Finnan, LLC (57) ABSTRACT

A cable hose suitable for welding or cutting systems includes tubing, one or more conductors, and an annular electromagnetic interference (EMI) shield. The EMI shield is disposed radially interiorly of at least a portion of the tubing and radially exteriorly of the one or more conductors. Thus, the EMI shield: (1) prevents EMI emanating from the one or more conductors from exiting the cable hose radially; and (2) conducts current between components of a welding or cutting system.

20 Claims, 5 Drawing Sheets

(56) References Cited

U.S. PATENT DOCUMENTS

| | | | |
|---|---|---|---|
| 5,777,273 | A | 7/1998 | Woody et al. |
| 6,215,090 | B1 | 4/2001 | Severance, Jr. et al. |
| 6,239,373 | B1 | 5/2001 | Sato et al. |
| 6,337,443 | B1 | 1/2002 | Dlugas et al. |
| 7,081,586 | B2 | 7/2006 | Rehrig |
| 7,750,240 | B2 | 7/2010 | Jiang et al. |
| 8,269,134 | B2 | 9/2012 | Lin et al. |
| 8,530,780 | B2 | 9/2013 | Lin et al. |
| 8,726,499 | B2 | 5/2014 | McGiboney et al. |
| 8,907,249 | B2 | 12/2014 | Berger et al. |
| 8,952,294 | B2 | 2/2015 | Serio |
| 9,102,001 | B2 | 8/2015 | Basit |
| 9,288,888 | B2 | 3/2016 | Griffin et al. |
| 9,449,739 | B2 | 9/2016 | Gao et al. |
| 9,717,168 | B2 | 7/2017 | Inoue et al. |
| 9,862,056 | B2 | 1/2018 | Berger et al. |
| 9,963,808 | B2 * | 5/2018 | Yamaguchi ............ H05K 9/009 |
| 10,368,401 | B2 * | 7/2019 | Wen ....................... H05B 3/286 |
| 2015/0083458 | A1 | 3/2015 | Tanaka et al. |
| 2015/0374978 | A1 | 12/2015 | Howard et al. |
| 2016/0205816 | A1 | 7/2016 | Inoue et al. |
| 2017/0276267 | A1 | 9/2017 | Green et al. |

FOREIGN PATENT DOCUMENTS

| | | |
|---|---|---|
| EP | 0709610 A1 | 5/1996 |
| EP | 0751536 A2 | 1/1997 |
| EP | 3179485 A1 | 6/2017 |
| IT | 8020090568 A1 | 3/2011 |
| KR | 20100108726 A | 10/2010 |
| WO | 2017133893 A1 | 8/2017 |

OTHER PUBLICATIONS

Communication pursuant to Article 94(3) EPC for EP Application No. 19195738.0 dated Nov. 24, 2020, 6 pages.

* cited by examiner

CABLE HOSE WITH CONDUCTIVE ELECTROMAGNETIC INTERFERENCE SHIELD

TECHNICAL FIELD

The present disclosure is directed toward cable hoses and, in particular, to cable hoses with an electromagnetic interference shield that can conduct current.

BACKGROUND

Welding and cutting systems, such as plasma cutting systems, typically include multiple interconnected components. For example, a plasma cutting system may include a gas supply, a torch assembly, and a clamp that are each connected to a power source that interconnects these components. At least some of these components are connected to the power source by cable hoses (also referred to as leads, welding cables, etc.) that can guide welding or cutting resources, including gas and electricity, to their intended destination. That is, cable hoses are capable of transferring gas and electricity. To effectuate this, cable hoses typically include a first conduit or passageway for gas and a second conduit or passageway for conductors.

At least some of these cable hoses include electromagnetic interference (EMI) shields. For example, in plasma cutting torches that utilize high frequency starting, a pulse of transient voltage breaks down the dielectric withstand voltage of the air or medium to create an initial arc between a cathode and anode (e.g., the electrode and nozzle) in the torch. Although this pulse is effective at starting an arc, the pulse may create EMI that might damage and/or disrupt the performance of machinery/electronics in proximity of the pulse. Consequently, cable hoses for torches with high frequency starting often include exterior shielding to shield against the EMI.

For example, often, outer surfaces of cable hoses are wrapped with a grounded EMI shield so that the EMI shield can reflect EMI or pick up the noise and conduct it to ground. Unfortunately, external shields increase the outer diameter of a cable hose and may deform during or due to flexure of the cable hose (since external shields are the outermost component of a cable hose). Additionally, it may be relatively expensive to coat the outer tube 106 with an external shield 145 that serves no other purpose other than shielding. Thus, often, end users may avoid welding and cutting processes that require shielded cable hoses. Consequently, smaller, simpler, and structurally sound cable hoses with EMI shielding that can carry out multiple tasks are desired.

SUMMARY

The present disclosure is directed towards cable hoses for welding or cutting systems and methods of forming the same. According to one embodiment, a cable hose suitable for welding or cutting systems includes tubing, one or more conductors, and a conductive, annular electromagnetic interference (EMI) shield. The EMI shield is disposed radially interiorly of at least a portion of the tubing and radially exteriorly of the one or more conductors so that the EMI shield: (1) prevents EMI emanating from the one or more conductors from exiting the cable hose radially; and (2) conducts current between components of a welding or cutting system. Advantageously, this EMI shield provides two functions and, thus, allows components of traditional cable hoses to be eliminated from the cable hose presented herein. Thus, the cable hose presented herein may be smaller (and, thus, cheaper) than exterior EMI shields. Due to its location, this EMI shield may also be more structurally sound than external EMI shields since it may be supported by tubing that is radially exterior of the EMI shield.

In at least some of these embodiments, the EMI shield is embedded within the tubing. For example, the tubing may be formed from an insulator and the EMI shield may be embedded within the tubing by molding the insulator over the EMI shield. Additionally or alternatively, the one or more conductors may be embedded within the tubing. For example, the tubing may comprise monolithic tubing that is disposed radially exteriorly and radially interiorly of the EMI shield and that extends around and between the one or more conductors. In these embodiments, the monolithic tubing defines: (1) a discrete passageway for the EMI shield that provides a closed path from a first end of the cable hose to a second end of the cable hose for the EMI shield; (2) one or more discrete passageways for the one or more conductors that provide a closed path from the first end of the cable hose to the second end of the cable hose for each of the one or more conductors; and (3) an inner conduit configured to allow a gas to flow from the first end to the second end. Moreover, in some of these embodiments, the one or more conductors are a plurality of conductors and the monolithic tubing is formed around and between the EMI shield and the plurality of conductors by molding the insulator over the plurality of conductors. Embedding the EMI shield and/or the conductors in the tubing may offer a number of advantages, including added structural integrity.

In other embodiments where the EMI shield is embedded within the tubing, the tubing includes an outer tube and an inner tube. In these embodiments, the EMI shield is embedded in the outer tube and the one or more conductors are disposed in an annular compartment disposed between the outer tube and the inner tube. Alternatively, the EMI shield need not be embedded in the tubing. For example, in some of embodiments, the tubing includes an outer tube and an inner tube, the EMI shield is coupled to an inner surface of the outer tube, and the one or more conductors are disposed in an annular compartment disposed between the outer tube and the inner tube. Thus, the internal EMI shield can be easily added to any number of cable hoses, even cable hoses manufactured with preset manufacturing processes.

Moreover, in some embodiments of the cable hose provided herein, the EMI shield is fixed in place within the tubing from a first end of the cable hose to a second end of the cable hose. Additionally or alternatively, the tubing may define an inner conduit and an outer surface of the cable hose, and both the one or more conductors and the EMI shield may be disposed between the inner conduit and the outer surface.

Still further, in some embodiments, the cable hose connects a power source to a plasma arc torch assembly, a first conductor of the one or more conductors is a high frequency start conductor, and the EMI shield is configured to prevent EMI generated by a high frequency pulse traveling along the first conductor from exiting the cable hose radially. This may allow high frequency starting plasma arc torches to be used in close proximity with electronics, such as electronics for automated operations (e.g., computer numerical control (CNC) machines) and, thus, may allow end users to leverage advantages of high frequency starting torches for various operations that often cannot use high frequency starting torches, such as automated cutting operations. In at least some of these embodiments, the EMI shield conducts working current between the plasma arc torch assembly and the power source after the high frequency pulse travels along the first conductor. In at least some of these embodiments, the one or more conductors do not transfer working current between the plasma arc torch assembly and the power source. Thus, the cable hose presented herein may include less conductors than other cable hoses and the cable hose presented herein may be lighter, smaller, and/or cheaper than other cable hoses.

According to another embodiment, a welding or cutting system is presented herein. The system includes a power source, a torch assembly, and a cable hose that extends between the power source and the torch assembly. The cable hose includes tubing, one or more conductors, and a conductive, annular electromagnetic interference (EMI) shield that is disposed radially interiorly of at least a portion of the tubing and radially exteriorly of the one or more conductors. Thus, the EMI shield: (1) prevents EMI emanating from the one or more conductors from exiting the cable hose; and (2) conducts current between the power source and the torch assembly.

According to yet another embodiment, a method of forming a cable hose is presented herein. The method includes providing a conductive, annular electromagnetic interference (EMI) shield for a cable hose and arranging one or more conductors in a specific configuration radially interiorly of the EMI shield so that the EMI shield prevents EMI emanating from the one or more conductors from exiting the cable hose radially. The method also includes arranging tubing radially exterior of the of the EMI shield so the EMI shield can conduct current between components of a welding or cutting system.

BRIEF DESCRIPTION OF THE SEVERAL VIEWS OF THE DRAWINGS

Like numerals identify like components throughout the figures.

DETAILED DESCRIPTION

An improved cable hose and method for forming the same are presented herein. The cable hose includes a conductive electromagnetic interference (EMI) shield that surrounds (e.g., circumferentially encloses) one or more conductors disposed in the cable hose to provide shielding for any EMI emanating from the one or more conductors. Additionally, and importantly, the internal EMI shield conducts operational current for cutting or welding operations. For example, if the cable hose presented herein connects a power source to a plasma torch assembly utilizing a high frequency start, the internal EMI shield may provide shielding for a high frequency pulse and, after the pulse has passed, the internal EMI shield may conduct working current between the plasma torch assembly and the power source. Since the EMI shield conducts current, the cable hose can include less conductors as compared to shielded cable hoses that require one or more conductors dedicated to conducting working current. For at least this reason, the cable hose presented herein may have a reduced size, weight, and/or cost of manufacturing as compared to other shielded cable hoses. Moreover, since the EMI shield conducts current while a media (e.g., gas or liquid) flows through the cable, the media may cool the EMI shield (e.g., transfer resistive heat away from the EMI shield) during current conduction and, thus, the EMI shield can be formed with relatively light gauge wires to further reduce the size, weight, and/or cost of the cable hose.

The conductive EMI shield presented herein is also "internal," insofar as "internal" means that the EMI shield is disposed radially interiorly of at least a portion of insulating tubing used to form the cable hose. For example, in some embodiments, an EMI shield may be coupled to and/or positioned adjacent to the inner surface 107 of the outer tube 106. Alternatively, the internal EMI shield presented herein may be embedded in tubing of a cable hose. For example, at least a portion of the cable hose may be formed from unitary or monolithic (i.e., one-piece) tubing and the EMI shield may be embedded in the monolithic tubing (e.g., the tubing may be overmolded on the EMI shield and/or conductors). Notably, since the EMI shield serves as an electrical conductor, the EMI shield should not be the outermost component of a cable hose. If the EMI shield were the outermost component, the cable hose might shock or injure an end user who bumps, grabs, or otherwise contacts the cable hose while it is conducting current thought the EMI shield. In fact, unless the EMI shield is insulated from an outer surface of a cable hose and other conductive components included in the cable hose, an EMI shield cannot be conductive. For example, an EMI shield resting on an uninsulated conductor should not be conductive.

Regardless of how the EMI shield is positioned within a cable hose, an internal EMI shield may have a reduced overall size as compared to an external EMI shield, which may reduce the cost of manufacturing/procuring the EMI shield. For example, the EMI shield may have a reduced diameter as compared to exterior shielding that is applied to the outer dimensions of a cable hose as a coating and thus, may be manufactured from less material (at less cost). Additionally, when a cable hose includes an exterior EMI shield, the EMI shield may deform or develop holes during and/or due to flexure of the cable hose. By comparison, when the EMI shield is disposed within at least a portion of tubing, the tubing may maintain the form factor, spacing, and integrity of the EMI shield and prevent or discourage deformation of the EMI shield, especially if the EMI shield is embedded within tubing. That is, the tubing may prevent, or at least discourage, holes from forming in an internal EMI shield during and/or due to flexure of the cable hose. An internal, annular EMI shield may also have a large surface area that is equidistant from a gas flow passage (e.g., an internal surface of the EMI shield may have a constant or uniform proximity to a media (e.g., gas or liquid) flowing through the cable hose) and thus, the EMI shield may experience enhanced cooling at least as compared to a single wire mounted in a particular location within the insulation of a cable hose (which only has a small surface area disposed proximate flowing media).

Figure 1:
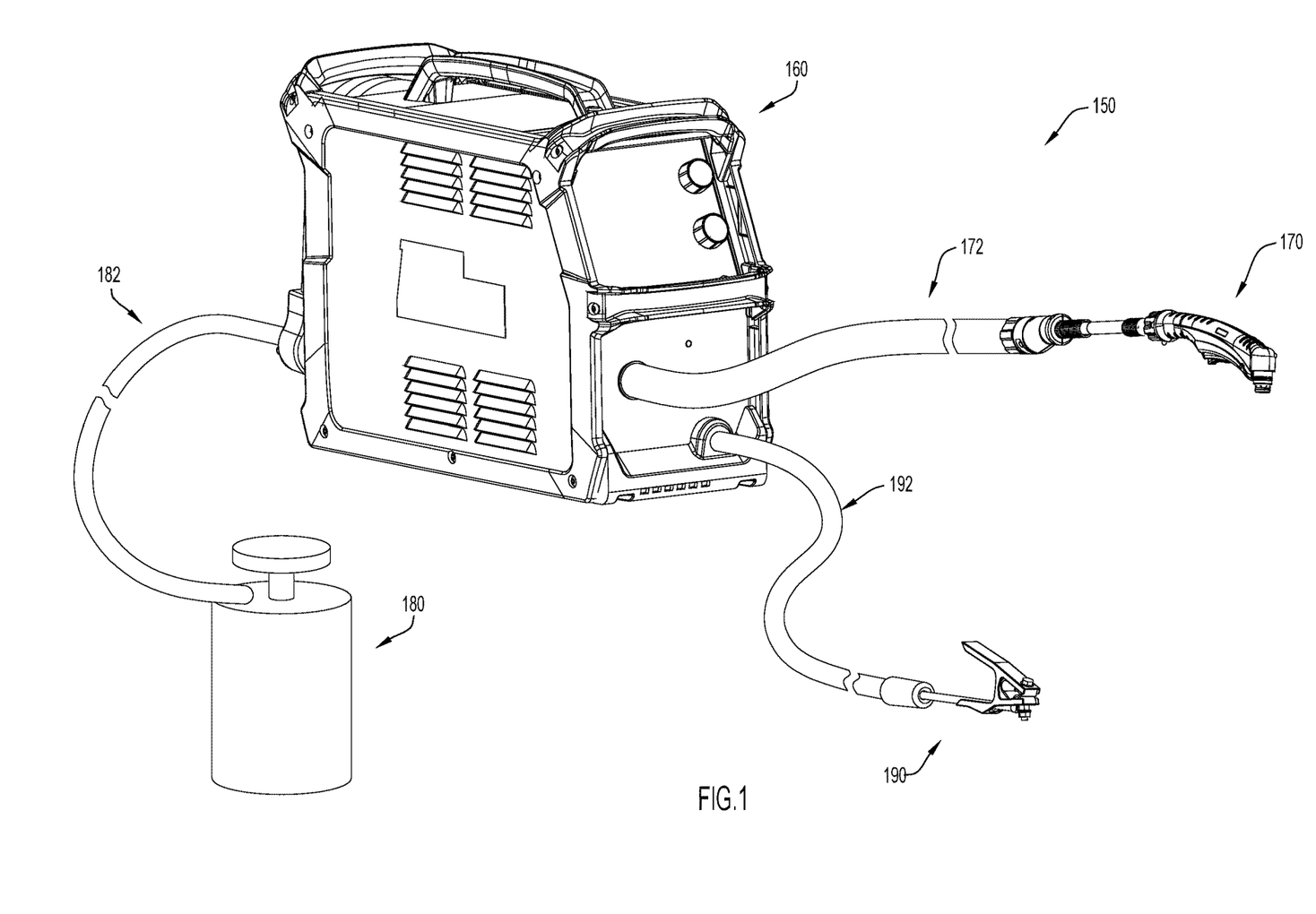
FIG. 1 is a perspective view of a cutting system including a gas supply, a power source, a torch assembly, and at least one cable hose with a conductive electromagnetic interference shield formed in accordance with an example embodiment of the present disclosure.

FIG. 1 illustrates an example embodiment of cutting system 150 that may utilize the cable hose presented herein. At a high-level, the depicted cutting system 150 includes a power source 160 that supplies power to a torch assembly 170. The power source 160 also controls the flow of gas from a gas supply 180 to the torch assembly 170 (however, in other embodiments, the power source 160 might supply the gas itself). The gas supply 180 is connected to the power source via cable hose 182 and the power source 160 is connected to the torch assembly 170 via cable hose 172. The cutting system 150 also includes a working lead 192 with a grounding clamp 190. As is illustrated, cable hose 172, cable hose 182, and/or cable hose 192 may each be any length. In order to connect the aforementioned components, the opposing ends of cable hose 172, cable hose 182, and/or cable hose 192 may each be coupled to the power source 160, torch assembly 170, gas supply 180, or clamp 190 in any manner now known or developed hereafter (e.g., a releasable connection).

Although not shown, the cable hoses presented herein might also be used in welding systems, automated cutting systems, and/or any other system in which welding/cutting resources or signals might need to flow between two components. In fact, since the cable hoses presented herein shield EMI, the cable hoses presented herein may allow plasma arc torches utilizing a high frequency start method to be used with automated equipment, such as computer numerical control (CNC) machines/controllers, with reduced or no EMI shielding (e.g., the automated equipment may have reduced shielding as compared to equipment typically used with high frequency starting plasma arc torches). That is, the cable hose presented herein may allow torches with high frequency starting to be used with automated equipment because the cable hose may effectively and efficiently shield the EMI generated by a high frequency start to negate risks associated with EMI emission. This may provide a significant savings for automated setup and may also be advantageous because in at least some instances, high frequency starting may be advantageous as compared to other starting methods. For example, high frequency starting may minimize the time that a pilot arc is maintained in the torch assembly, which may extend the life of various consumable components included in a plasma arc torch. Consequently, the cable hoses presented herein may improve the quality and/or lifespan of torches that can be used with automated cutting (or welding operations).

The cable hose presented herein may be most useful as cable hose 172 (e.g., to transfer signals, current, gas, etc. between a power source and a torch assembly while also shielding EMI generated by the current and/or signals, and, in particular, EMI generated by a high frequency pulse); however, the cable hose presented herein may also be used as cable hose 182 (e.g., to transfer signals and gas between a power source and a gas supply while shielding EMI generated by any signals), and/or cable hose 192 (e.g., to transfer signals and current between a power source and a clamp while shielding EMI generated by the signals and/or current) if desired. Additionally, as mentioned above, the cable hose presented herein can be used for any welding or cutting operations in which welding/cutting resources or signals might need to flow between two components with EMI shielding.

Figure 2:
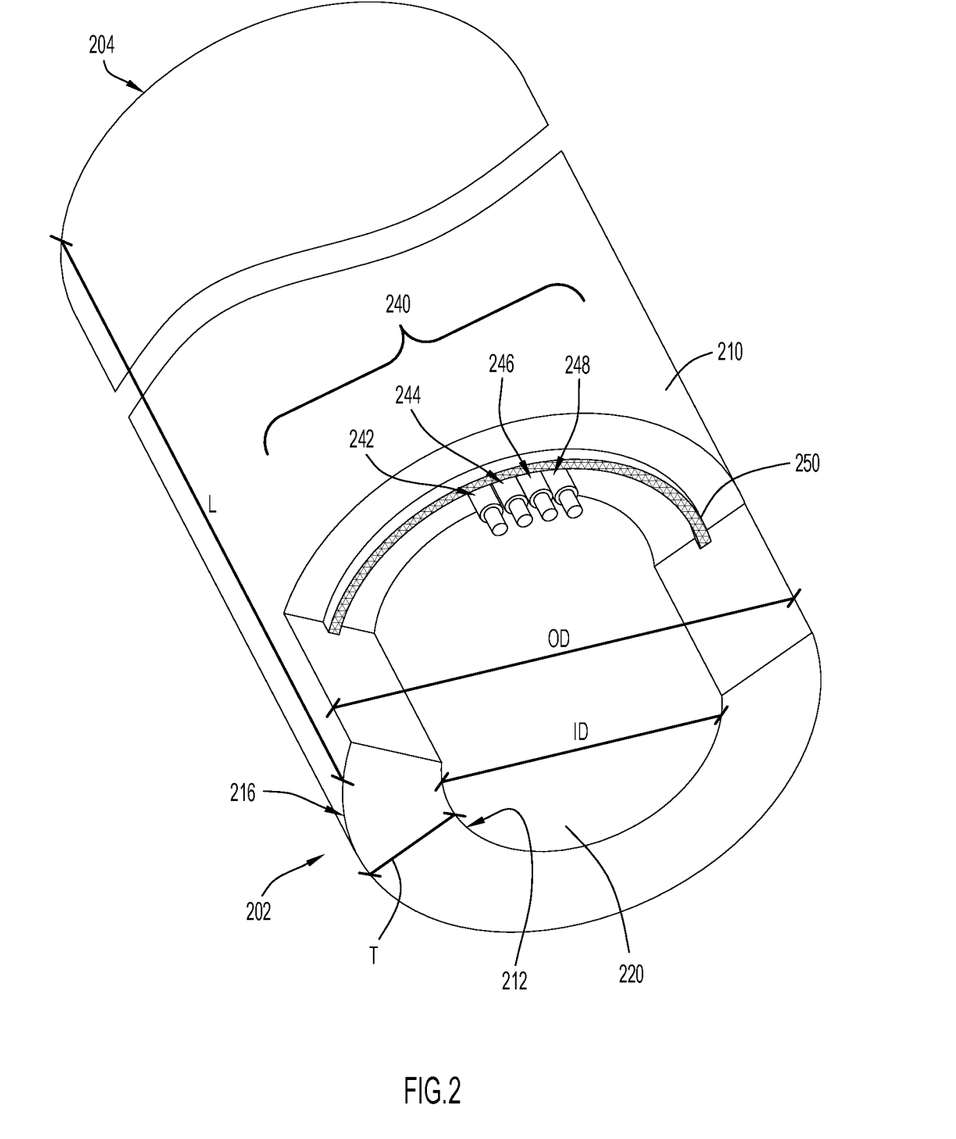
FIG. 2 is a perspective sectional view of an embodiment of a cable hose with a conductive electromagnetic interference shield formed in accordance with an example embodiment of the present disclosure.
Figure 3A:
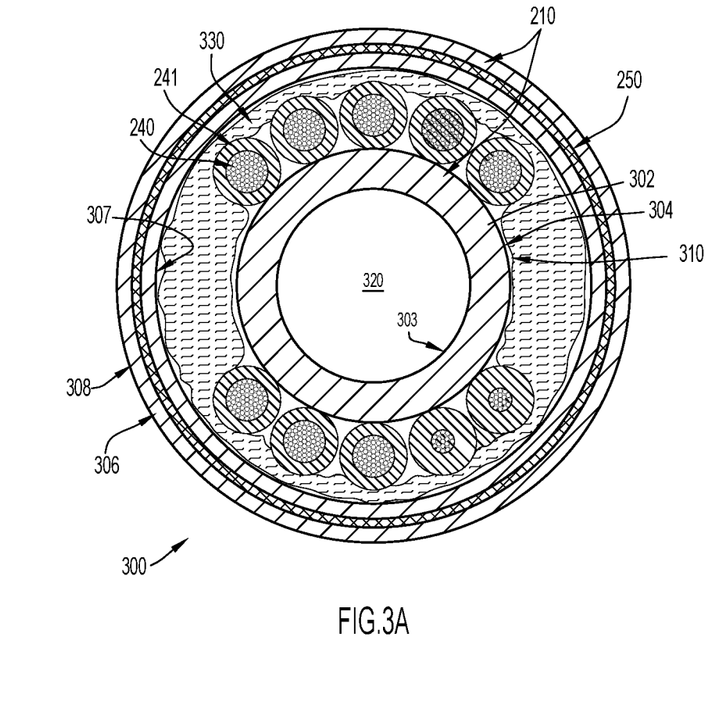
FIGS. 3A and 3B are front sectional views of two additional embodiments of a cable hose with a conductive electromagnetic interference shield formed in accordance with example embodiments of the present disclosure.
Figure 3B:
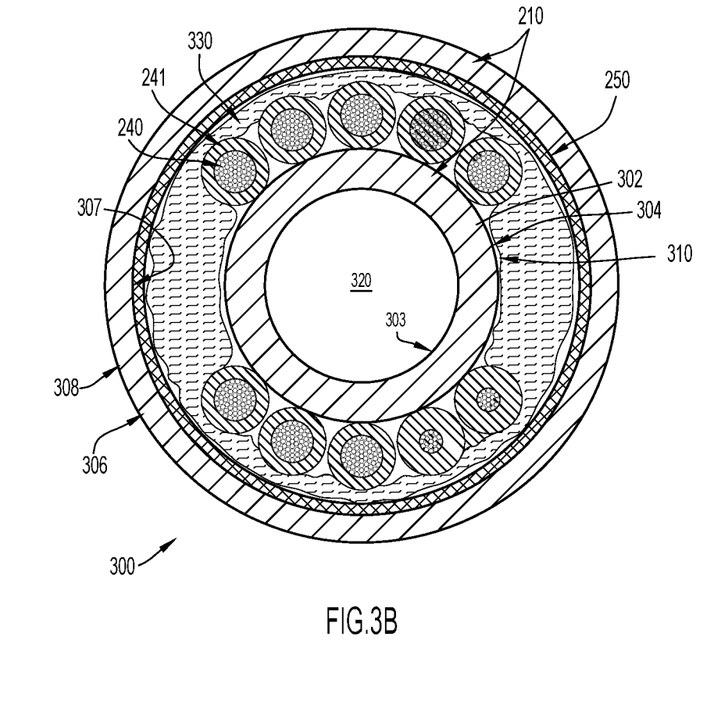

Now turning to FIGS. 2, 3A, and 3B, but with an emphasis on FIG. 2, generally, the cable hose presented herein extends from a first end 202 (e.g., an end that can connect to a power source) to a second end 204 (e.g., an end that can connect to a torch assembly). More specifically, the cable hose presented herein includes tubing 210 and an inner conduit 210. The tubing 210 provides a path from the first end 202 to the second end 204 for a specific configuration of an annular, conductive EMI shield 250 and one or more conductors 240. Meanwhile, the inner conduit 220 is configured to allow a welding resource, such as gas or a welding wire, to flow/travel from the first end 202 of the cable hose to the second end 204 of the cable hose. The length "L" between the first end 202 and the second end 204 can be any desirable length, such as a length in the range of approximately three (3) feet to approximately one hundred fifty (150) feet. Although this length is only shown in FIG. 2, it is to be understood that the cable hose 300 shown in FIG. 3A and the cable hose 301 shown in FIG. 3B may also have any desirable length.

Still referring to FIGS. 2, 3A, 3B, each of the depicted embodiments includes one or more conductors 240 that are disposed radially interiorly of an annular, internal, conductive EMI shield 250. The EMI shield 250 is an annular shield formed from braided (i.e., interweaved) conductors, such as aluminum, copper-clad aluminum, or copper electrical conductors. In most embodiments, the EMI shield is formed by braiding the conductors into an annular shape; however, in some embodiments, conductors might be braided into a flat member that is subsequently formed into an annular shape (and shields formed in either manner may be referred to herein as "annular"). The braid may have any desirable thickness, ranging from the thickness of one wire to the thickness of ten wires. However, notably, a one wire-thick braid may be sufficient to prevent EMI from escaping the cable hose and to conduct operational current between components of a welding or cutting system.

In fact, as mentioned above, in at least some embodiments, the EMI shield 250 may be formed from light gauge wires because the resistive heat (e.g., $I^2R$ losses, with I representing current and R representing resistance) generated by the EMI shield 250 when the EMI shield 250 is conducting current (in the manner explained in detail below) can be carried away by a media (e.g., gas or liquid) flowing through the inner conduit 220 of the cable hose 200. This cooling (e.g., removal of resistive heat) may be facilitated/ensured by at least two aspects of the present cable hose. First, since the EMI shield 250 is an annular, internal EMI shield 250, an inner or internal surface EMI shield 250 may have consistent proximity to the inner conduit 220 and may enhance cooling of the EMI shield 250, at least as compared to the cooling provided by the conduit 220 to a single wire mounted within the tubing 210 of the cable hose 200 (e.g., one of the conductors 240). Second, since the EMI shield 250 only conducts working current (e.g., direct current (DC)) while gas is flowing through the inner conduit 220 (as is also explained in further detail below), the EMI shield 250 will be continually cooled while functioning to conduct current (thereby enabling the use of an EMI shield 250 formed from relatively low gauge wire).

As mentioned above, the EMI shield 250 is an "internal" EMI shield because the EMI shield 250 is disposed within at least a portion of tubing 210 used to form the cable hose. However, in different embodiments, the EMI shield 250 may be disposed within different portions of the tubing 210. For example, in the example embodiment depicted in FIG. 2, the EMI shield 250 and the conductors 240 are embedded within monolithic tubing 210. By comparison, in the example embodiment depicted in FIG. 3A, the EMI shield 250 is embedded within an outer tube 306 of tubing 210 while the conductors 240 are disposed in a compartment formed between the outer tube 306 and an inner tube 302. Still further, in the example embodiment depicted in FIG. 3B, the EMI shield 250 is disposed on or adjacent an inner surface 307 of an outer tube 306 of tubing 210 while the conductors 240 are disposed in a compartment formed between the outer tube 306 and an inner tube 302. Each of these embodiments is addressed in more detail below.

The conductors included in the embodiments depicted in FIGS. 3, 4A, and 4B, which are generally referred to as conductors 240, may include electrical conductors that can pass current and signals and/or optical conductors that can pass optical images and/or signals. For example, the conductors 240 may be aluminum, copper-clad aluminum, or copper electrical conductors and/or fiber optic optical conductors. In various embodiments, the conductors 240 may include various conductors dedicated to specific tasks. Additionally, if desired, the conductors 240 may include individualized insulation 241 (see FIGS. 3A and 3B); however, individualized insulation 241 may not be necessary if the conductors 240 are embedded within a portion of the tubing 210, as is discussed at length in U.S. patent application Ser. No. 16/110,180, filed on Aug. 23, 2018, and entitled "Cable Hose with Embedded Features," which is hereby incorporated by reference in its entirety.

By way of example, in FIG. 2, the conductors 240 are each labeled. The conductors 240 include a first conductor 242 for conducting high frequency pulses, a second conductor 244 for conducting operational signals, and a third conductor 246 and fourth conductor 248 for conducting consumable identification signals. None of conductor 242, conductor 244, conductor 246, and conductor 248 in FIG. 2 include individualized insulation. Moreover, notably, since the EMI shield 250 can conduct operational/working current, none of the conductors 240 (e.g., none of conductor 242, conductor 244, conductor 246, and conductor 248) need to be dedicated to conducting operational/working current. Instead, conductors for working current can be omitted or removed from the cable hose (so that the cable hose includes less conductors 240 than a similar cable hose with a non-conductive or grounded EMI shield). Nonetheless, the conductors shown in FIG. 2 are merely example conducts and in other embodiments, any desirable conductors 240 aside from working current conductors may be disposed radially interiorly of the EMI shield 250. For example, the unlabeled conductors 240 in FIGS. 3A and 3B may be any desirable conductors aside from working current conductors.

Still referring to FIGS. 2, 3A, and 3B, the tubing 210 included in the cable hose presented herein is an electrical insulator, such as chlorinated polyethylene (PE), neoprene, polyvinyl chloride, silicone, polyolefin, ethylene propylene diene monomer (EPDM), acrylonitrile butadiene styrene (ABS) blends, or a combination thereof that is suitable of preventing current from leaking radially from the cable hose and/or for discouraging electrical or optical signals from exiting the cable hose 200 radially (although the tubing 210 may be ineffective at shielding EMI). The material forming the tubing 210 can also withstand the pressure of one or more working gases or fluids (or objects, such as welding wire) passing through an inner conduit 220 formed within the cable hose 200 and, thus, can protect (e.g., insulate) the EMI shield 250 and any electrical and or optical conductors 240 disposed within (e.g., embedded in) the tubing 210.

Now turning specifically to FIG. 2, as mentioned, in at least some embodiments, the cable hose 200 is formed from unitary or monolithic tubing 210. In FIG. 2, the tubing 210 is annular, monolithic tubing that extends from an inner surface or wall 212 to an outer surface or wall 216. The inner wall 212 defines an inner conduit 220 that may be suitable to guide gas (e.g., shielding gas, process gas, etc.), fluid (e.g., coolant, water, etc.), and/or wire (e.g., welding wire) from the first end 202 to the second end 204. In the depicted embodiments, the inner wall 212 and outer wall 216 have concentric and symmetrical or regular geometries; however, in other embodiments, the inner wall 212 and/or outer wall 216 need not be symmetrical and, instead, may be irregular, eccentric, and/or have any desirable configuration. For example, the outer wall 216 might be elliptical and the inner wall 212 might be a circular wall disposed adjacent one end of the elliptical outer wall 216.

A thickness "T" of the tubing 210 is defined by the difference between an outer diameter "OD" and an inner diameter "ID" and, in various embodiments, the thickness "T" may be adjusted by changing the inner diameter ID, the outer diameter OD, or both, to customize the cable hose 200 for any specifications. For example, in some instances, it may be desirable to expand the thickness T so that the tubing 210 can accommodate more conductors 240 and/or provide more insulation between conductors 240, as is discussed at length in U.S. patent application Ser. No. 16/110,180, filed on Aug. 23, 2018, and entitled "Cable Hose with Embedded Features," which is hereby incorporated by reference in its entirety.

In at least some embodiments, the tubing 210 is formed by overmolding a material, such as an electrical insulator, over one or more conductors 240 and the EMI shield 250. Consequently, the tubing 210 extends radially interiorly and radially exteriorly of the EMI shield 250 and also extends around and between the conductors 240. This secures each of the conductors 240 and the EMI shield 250 in a discrete position over the length L of the cable hose 200. That is, the tubing 210 creates a closed path from the first end 202 of the cable hose 200 to the second end 204 of the cable hose 200 for each conductor 240 and the EMI shield 250 so that the conductors 240 and the EMI shield 250 are not accessible from a location that is radially exterior of the cable hose 200. Instead, the conductors 240 and the EMI shield 250 are accessible from only the first end 202 or the second end 204. This prevents signals, current, and EMI from exiting the cable hose 200 radially and, instead, suppresses EMI while causing signals and current (in addition to gas, fluid, etc. traveling in the inner conduit 220), to traverse the cable hose 200 end-to-end (e.g., from the first end 202 to the second end 204). Moreover, since the tubing 210 defines discrete passageways that secure each of conductors 240 and the EMI shield 250 in a particular location or configuration along the length L of the cable hose 200 (from the first end 202 to the second end 204), the EMI shield 250 may be protected from deformation caused by flexure of the cable hose 200.

Now turning to FIGS. 3A and 3B, in these embodiments, cable hoses 300 and 301 are each formed from multiple pieces of tubing 210, but the EMI shield 250 is still internal to at least a portion of tubing 210. More specifically, in the embodiments depicted in FIGS. 3A and 3B, the tubing 210 includes an inner tube 302 with an inner surface 303 and an outer surface 304 and an outer tube 306 with an inner surface 307 and an outer surface 308. The inner surface 303 of the inner tube 302 defines an inner conduit 320 and the outer surface 304 of the inner tube 302 cooperates with the inner surface 307 of the outer tube 306 to define an annular compartment 310.

In cable hose 300 (FIG. 3A), the EMI shield 250 is embedded within the outer tube 308. Thus, in cable hose 300, the conductive EMI shield may be insulated from the conductors 240 by tubing 210. By comparison, in cable hose 301 (FIG. 3B), the EMI shield 250 is disposed on the inner surface 307 of the outer tube 306 and is insulated from the conductors 240 by filler material 330 and/or individualized insulation 241 included on the conductors 240. In at least some of embodiments, the EMI shield 250 is coupled to (e.g., affixed to) the inner surface 307 of the outer tube 306 in order to ensure it remains isolated from the conductors 240 (and to protect the EMI shield 250 from flexure). Alternatively, the filler material 330 may be an annular filler material 330 that is disposed in the annular compartment 310 and ensures that the EMI shield remains electrically isolated from the conductors 240. Regardless, in both of the embodiments depicted in FIGS. 3A and 3B, the EMI shield 250 surrounds the annular compartment 310 and, thus, any EMI emanating from conductors 240 will be shielded by the EMI shield 250.

Figure 4A:
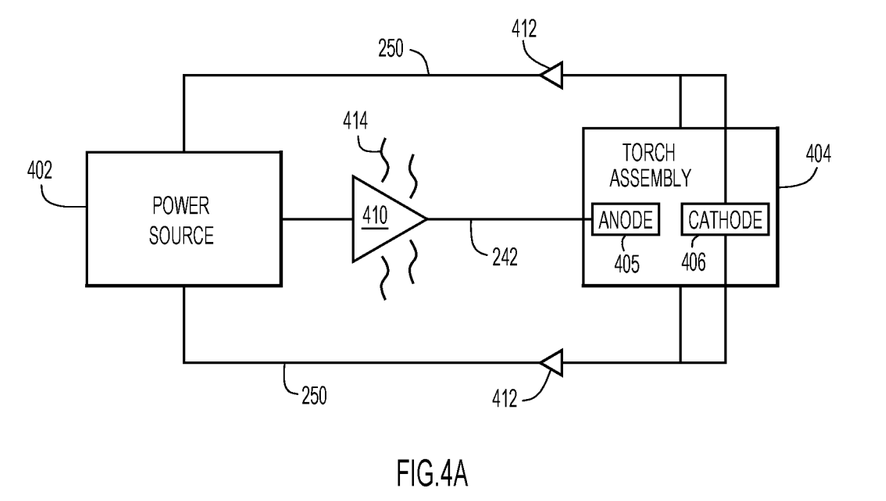
FIGS. 4A and 4B are high-level circuitry diagrams depicting electrical connections provided by a cable hose with a conductive electromagnetic interference shield formed in accordance with example embodiments of the present disclosure.
Figure 4B:
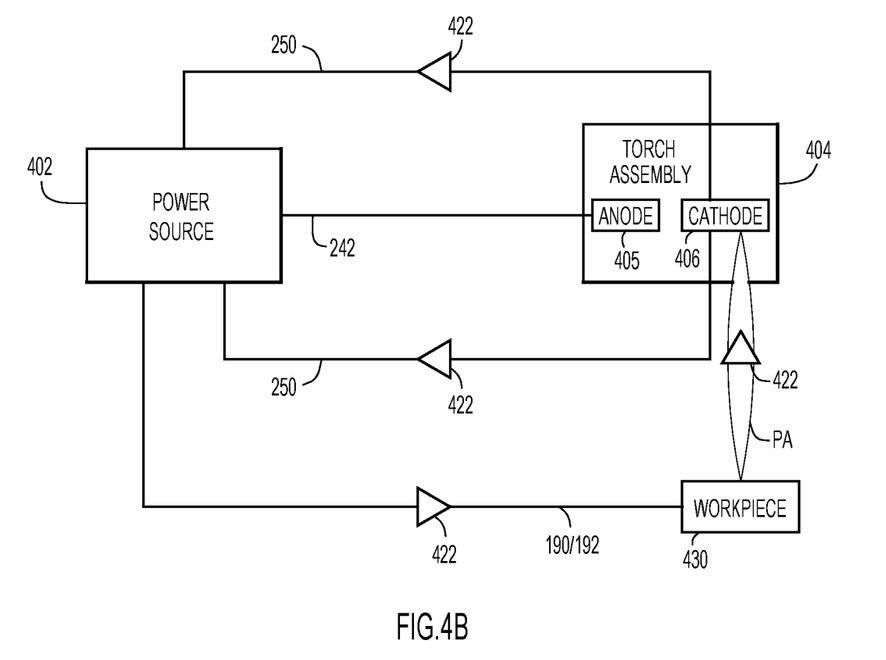

Now turning to FIGS. 4A and 4B, these Figures illustrate, at a high-level, the electrical circuitry provided by a cable hose including a conductive, internal EMI shield. That is, FIGS. 4A and 4B illustrate how the internal EMI shield 250 may shield EMI emanating from conductors 240 and may also conduct working current from one end (e.g., end 202) of the cable hose to an opposite end of the cable hose (e.g., end 204), in either direction. Since this functionality may be particularly useful for plasma arc torches utilizing a high frequency start, this functionality is described below with respect to a high-frequency pulse traveling along a conductor 242 (see FIG. 2) that is dedicated to high frequency starting. However, the example shown in FIGS. 4A and 4B is merely an example and the internal EMI shield presented herein may shield EMI generated by any current or conductor and may conduct current for any task. That is, if the cable hose presented herein is used for operations other than connecting a power source to a plasma arc torches utilizing a high frequency start, the EMI shield 250 will still not run to ground and, thus, may still conduct current between two components of a cutting or welding system.

That all being said, when the cable hose presented herein is connecting a power source 402 and high frequency starting plasma arc torch assembly 404, the EMI shield 250, together with other conductors/cable hoses, completes a circuit between either the power source 402 and the plasma arc torch assembly 404 (see FIG. 4A) or the power source 402, the plasma torch assembly 404, and a workpiece 430 (see FIG. 4B). That is, during arc initiation, the EMI shield 250 and conductor 242 complete a circuit between the power source 402 and the plasma arc torch assembly 404 as is shown in FIG. 4A (a pilot arc connects an anode 405 and a cathode 406 disposed in the torch assembly 404 to complete this circuit, despite not being shown in FIG. 4A). Then, during operations of the torch assembly 404 (e.g., cutting operations), the working lead 192 and grounding clamp 190, the EMI shield 250, and a plasma arc "PA" complete a circuit between the power source 402, the torch assembly 404, and the workpiece 430.

More specifically, in FIG. 4A, the power source 402 is shown delivering a pulse of high frequency current (illustrated at 410 and also referred to herein as "high frequency pulse" or "pulse") to an anode 405 disposed in the torch assembly 404 along conductor 242 during arc initiation for a plasma torch assembly 404. The conductor 242 connects the power source 402 to the anode 405 and the pulse causes initiation of a pilot arc between the anode 405 (e.g., a torch tip) and the cathode 406 (e.g., an electrode). Meanwhile the EMI shield 250 connects the power source 402 to the cathode 406 and, thus, the EMI shield 250 closes a circuit between the power source 402 and the torch assembly 404. Consequently, during arc initiation, current may travel from the power source 402 to the torch assembly 404 along conductor 242 (as depicted at 410) and current may travel from the torch assembly 404 to the power source 402 along the EMI shield 250 (as depicted at 412), insofar as current movement is being described herein in accordance with conventional current terminology, as opposed to electron flow terminology.

Since the conductor 242 and EMI shield 250 are each conducting current during starting (i.e., during arc initiation), as is shown at 410 and 412 in FIG. 4A, the electrical fields generated by a pulse of high frequency current (e.g., as illustrated at 410) will cancel out. In fact, despite the different sizes of arrows 410 and 412, the conductor 242 and EMI shield 250 may, in at least some embodiments, conduct equal current during starting so that the electrical fields are canceled or zeroed out and EMI generated by the high frequency pulse (illustrated at 414) is prevented from exiting the cable hose. Since the conductor 242 may not be perfectly centered within the EMI shield 250, the electrical fields may not be perfectly canceled out; however, the achieved cancellation may be sufficient to prevent harmful EMI from escaping the cable hose.

Once the pulse 410 generates an arc between the anode 405 and the cathode 406, the torch assembly 404 is moved towards a workpiece 430 until the arc jumps to the workpiece to establish a plasma arc "PA," as shown in FIG. 4B. As the plasma arc PA is established, the power source 402 may cut off power to the anode 405 while sending working current 422 to the torch assembly 404 via the workpiece 430 (again, in accordance with conventional current terminology). For example, although not shown, the power source 402 might include a DC power supply arranged in parallel with a combination of at least a high frequency generator, one or more resistors, and pilot arc contacts. In this scenario, the pilot arc contacts may open as the plasma arc PA is established so that the power source delivers DC current to the cathode 406 and workpiece 430 without delivering current to the anode 405.

Regardless of how the power source 402 switches from arc initiation to an operational mode, during operation of the torch assembly 404, the EMI shield 250 forms a portion of a closed circuit that allows working current 422 to flow between the power source 402, the torch assembly 404, and the workpiece 430. In particular, the working current 422 flows from a positive terminal of the power source 402, through the working lead 192 and grounding clamp 190, to the workpiece 430 (again, insofar as this description conforms with conventional current terminology). The working current 422 then flows from the workpiece 430 to the cathode 406 of the torch assembly via the plasma arc PA and, finally, flows from the cathode 406 back to the power source 402 (e.g., to a negative terminal of a DC power source 402) via the EMI shield 250. Thus, the EMI shield 250 allows working current to flow between the torch assembly 404 and the power source 402. Moreover, although conventional current terminology is used herein, it is to be understood that this terminology indicates that electrons are flowing from the power source 402 to the cathode 406 via the EMI shield 250 during operation of the torch assembly 404. Thus, in some instances, the EMI shield 250 may be described as being configured to deliver power to a torch assembly 404.

Figure 5:
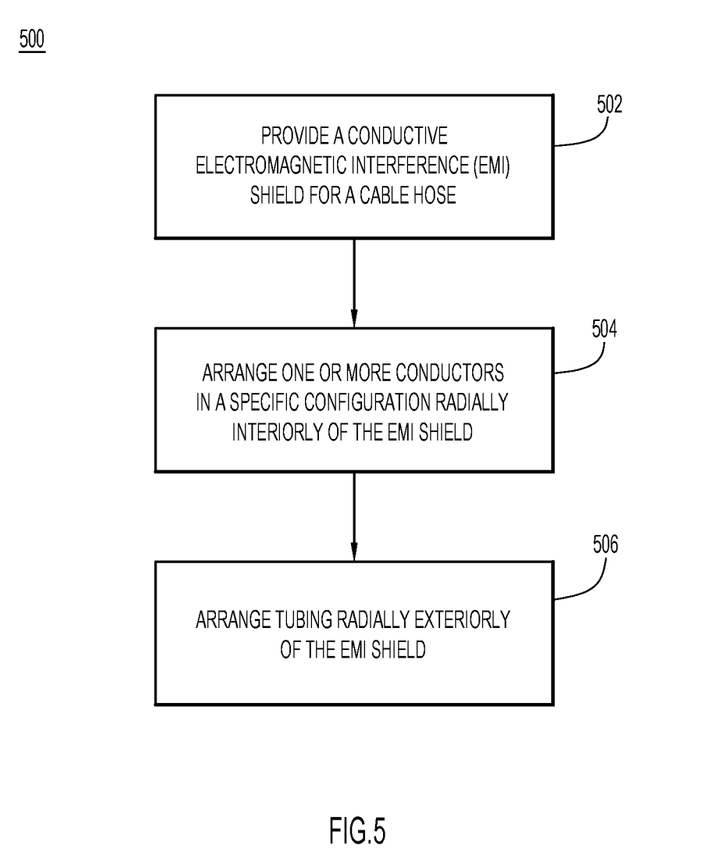
FIG. 5 is a high-level flow chart illustrating a method for forming a cable hose with a conductive electromagnetic interference shield in accordance with an example embodiment of the present disclosure.

FIG. 5 depicts a high-level flow chart illustrating a method 500 for forming a cable hose with an internal, conductive EMI shield in accordance with an example embodiment of the present disclosure. At 502, a conductive EMI shield is provided (e.g., procured or formed/manufactured by braiding conductive wires into an annular braid). At 504, one or more of conductors are arranged in a specific configuration radially interiorly of the EMI Shield. For example, a set of uninsulated or insulated conductors can be aligned in a straight or helical configuration around a circumference of a cross-sectional area. Arranging the conductors radially interiorly of the EMI shield prevents, or at least discourages, EMI emanating from the one or more conductors from exiting the cable hose radially.

At 506, tubing (e.g., an insulator) is arranged radially exteriorly of the EMI shield. For example, in at least some embodiments, tubing is overmolded onto the one or more conductors and the EMI shield to form a monolithic tubing that extends around and between the EMI shield and the one or more conductors to secure the EMI shield and the one or more conductors in the specific configuration and to define an inner conduit, as is shown in FIG. 2. Alternatively, tubing may be overmolded onto only the EMI shield and the one or more conductors may be confined between an inner tube and an outer tube, as is shown in FIG. 3A. Still further, the tubing may simply be formed around (e.g., radially exteriorly of) the EMI shield and the EMI shield and the one or more conductors may be confined between an inner tube and an outer tube, as is shown in FIG. 3B. Regardless of how the tubing (e.g., tubing 210) is arranged radially exteriorly of the EMI shield, providing tubing in this position covers the EMI shield with an insulator and, thus, renders it safe for the EMI shield to conduct current between components of a welding or cutting system.

To summarize, in one form a cable hose suitable for welding or cutting systems is presented herein, the cable hose comprising: tubing; one or more conductors; and a conductive, annular electromagnetic interference (EMI) shield that is disposed radially interiorly of at least a portion of the tubing and radially exteriorly of the one or more conductors so that the EMI shield: (1) prevents EMI emanating from the one or more conductors from exiting the cable hose radially; and (2) conducts current between components of a welding or cutting system.

In another form, a welding or cutting system is presented herein, the system comprising: a power source; a torch assembly; and a cable hose extending between the power source and the torch assembly, the cable hose including tubing, one or more conductors, and a conductive, annular electromagnetic interference (EMI) shield that is disposed radially interiorly of at least a portion of the tubing and radially exteriorly of the one or more conductors so that the EMI shield: (1) prevents EMI emanating from the one or more conductors from exiting the cable hose; and (2) conducts between the power source and the torch assembly.

In yet another form, method of forming a cable hose is presented herein, the method comprising: providing a conductive, annular electromagnetic interference (EMI) shield for a cable hose; arranging one or more conductors in a specific configuration radially interiorly of the EMI shield so that the EMI shield prevents EMI emanating from the one or more conductors from exiting the cable hose radially; and arranging tubing radially exterior of the EMI shield so the EMI shield can conduct current between components of a welding or cutting system.

Although the techniques are illustrated and described herein as embodied in one or more specific examples, the specific details of the examples are not intended to limit the scope of the techniques presented herein, since various modifications and structural changes may be made within the scope and range of the invention. For example, a cable hose formed in accordance with the techniques presented herein may include any number of embedded conductors, arranged in any desirable configuration within the EMI shield. In addition, various features from one of the examples discussed herein may be incorporated into any other examples. Accordingly, the appended claims should be construed broadly and in a manner consistent with the scope of the disclosure.

We claim:

1. A cable hose suitable for welding or cutting systems, comprising:
    tubing;
    a plurality of conductors comprising:
        a high frequency conductor; and
        a second conductor dedicated to conducting operating signals; and
    a conductive, annular electromagnetic interference (EMI) shield that is disposed radially interiorly of at least a portion of the tubing and radially exteriorly of the plurality of conductors, the EMI shield being configured to: (1) prevent EMI emanating from the plurality of conductors from exiting the cable hose radially during arc initiation; and (2) complete a circuit between a power source and an electrode of a welding or cutting system after arc initiation and conduct working current to the electrode.

2. The cable hose of claim 1, wherein the EMI shield is embedded within the tubing.

3. The cable hose of claim 2, wherein the tubing comprises an insulator and the EMI shield is embedded within the tubing by molding the insulator over the EMI shield.

4. The cable hose of claim 2, wherein the plurality of conductors are embedded within the tubing.

5. The cable hose of claim 4, wherein the tubing comprises:
    monolithic tubing that is disposed radially exteriorly and radially interiorly of the EMI shield and that extends around and between the plurality of conductors to define: (1) a discrete passageway for the EMI shield that provides a closed path from a first end of the cable hose to a second end of the cable hose for the EMI shield; (2) one or more discrete passageways for the plurality of conductors that provide a closed path from the first end of the cable hose to the second end of the cable hose for each of the plurality of conductors; and (3) an inner conduit configured to allow a gas to flow from the first end to the second end.

6. The cable hose of claim 5, wherein the monolithic tubing comprises a molded insulator disposed around and between the EMI shield and the plurality of conductors.

7. The cable hose of claim 2, wherein the tubing comprises:
    an outer tube; and
    an inner tube, wherein the EMI shield is embedded in the outer tube and the plurality of conductors are disposed in an annular compartment disposed between the outer tube and the inner tube.

8. The cable hose of claim 1, wherein the tubing comprises:
an outer tube; and
an inner tube, wherein the EMI shield is coupled to an inner surface of the outer tube and the plurality of conductors are disposed in an annular compartment disposed between the outer tube and the inner tube.

9. The cable hose of claim 1, wherein the EMI shield is fixed in place within the tubing from a first end of the cable hose to a second end of the cable hose.

10. The cable hose of claim 1, wherein the tubing defines an inner conduit and an outer surface of the cable hose, and both the plurality of conductors and the EMI shield are disposed between the inner conduit and the outer surface.

11. The cable hose of claim 1, wherein the cable hose connects the power source to a plasma arc torch assembly, and the EMI shield is configured to prevent EMI generated by a high frequency pulse traveling along the high frequency conductor from exiting the cable hose radially.

12. The cable hose of claim 11, wherein the EMI shield is configured to conduct the working current between the plasma arc torch assembly and the power source after the high frequency pulse travels along the high frequency conductor.

13. The cable hose of claim 12, wherein the plurality of conductors are not configured to transfer the working current to the plasma arc torch assembly.

14. A welding or cutting system comprising:
a power source;
a torch assembly; and
a cable hose extending between the power source and the torch assembly, the cable hose including tubing, a plurality of conductors, and a conductive, annular electromagnetic interference (EMI) shield that is disposed radially interiorly of at least a portion of the tubing and radially exteriorly of the plurality of conductors;
the plurality of conductors comprising:
a high frequency conductor; and
a second conductor dedicated to conducting operating signals,
wherein, the EMI shield is configured to: (1) prevent EMI emanating from the plurality of conductors from exiting the cable hose radially during arc initiation; and (2) complete a circuit between the power source and an electrode after arc initiation to conduct working current to the electrode of the torch assembly.

15. The system of claim 14, wherein the EMI shield is embedded within the tubing.

16. The system of claim 15, wherein the tubing of the cable hose comprises:
monolithic tubing that is disposed radially exteriorly and radially interiorly of the EMI shield and that extends around and between the plurality of conductors to define: (1) a discrete passageway for the EMI shield that provides a closed path from a first end of the cable hose to a second end of the cable hose for the EMI shield; (2) one or more discrete passageways for the plurality of conductors that provide a closed path from the first end of the cable hose to the second end of the cable hose for each of the plurality of conductors; and (3) an inner conduit configured to allow a gas to flow from the first end to the second end.

17. The system of claim 14, wherein the torch assembly comprises a plasma arc torch assembly, and the EMI shield is configured to prevent EMI generated by a high frequency pulse traveling along the high frequency conductor from exiting the cable hose radially.

18. The system of claim 17, wherein the EMI shield conducts working current between the plasma arc torch assembly and the power source after the high frequency pulse travels along the high frequency conductor.

19. A method of forming a cable hose, comprising:
providing a conductive, annular electromagnetic interference (EMI) shield for the cable hose, the annular EMI shield comprising braided conductors configured to conduct a working current for a plasma arc torch;
arranging a plurality of conductors in a specific configuration radially interiorly of the annular EMI shield so that the annular EMI shield prevents EMI emanating from the one or more plurality of conductors from exiting the cable hose radially, the plurality of conductors comprising a high frequency start conductor and a second conductor dedicated to conducting operating signals; and
arranging tubing radially exterior of the annular EMI shield so the annular EMI shield can complete a circuit and conduct current between a power source and an electrode of a welding or cutting system.

20. The method of claim 19, wherein the arranging comprises:
overmolding an insulator onto at least the annular EMI shield to secure the annular EMI shield in a specific configuration from a first end of the cable hose to a second end of the cable hose.

* * * * *